United States Patent

Wittkamp

[11] 3,974,705
[45] Aug. 17, 1976

[54] MECHANISM FOR MOVING SLIDES IN MACHINE TOOLS

[75] Inventor: Theodor Wittkamp, Bielefeld, Germany

[73] Assignee: Gildemeister Aktiengesellschaft, Bielefeld, Germany

[22] Filed: July 26, 1974

[21] Appl. No.: 493,991

[30] Foreign Application Priority Data

Aug. 2, 1973 Germany............................ 2339190

[52] U.S. Cl........................................ 74/53; 82/19; 74/29; 74/600
[51] Int. Cl.²............... F16H 21/42; F16H 21/50; F16H 37/12
[58] Field of Search ............... 74/55, 600, 519; 82/3, 82/19

[56] References Cited
UNITED STATES PATENTS 1,369,164    2/1921    Christopher ...................... 74/600 X Primary Examiner—Samuel Scott
Attorney, Agent, or Firm—Michael J. Striker

[57] ABSTRACT

A mechanism for moving a cross slide in a multiple-spindle automatic machine has a rotary face cam which is driven by a gear and is angularly adjustable with respect to the gear, a first lever which is pivotable on a first shaft parallel to the axis of the cam and which has a first arm carrying a roller follower for the cam and a second arm having a slot for a sliding block which is mounted on a pin-shaped carrier. The carrier extends through one or more slots of a second lever which is rigid with a second shaft, and the carrier can be fixed to the second shaft in a selected position by means of washers and nuts. The second shaft is rigid with a gear segment which meshes with a toothed rack affixed to and adjustable lengthwise of the slide. The first lever may be a bell crank lever or a straight two-armed lever, and the second lever may have a single arm with a single slot for the carrier of the sliding block or a bifurcated arm with two aligned slots for the carrier.

10 Claims, 5 Drawing Figures

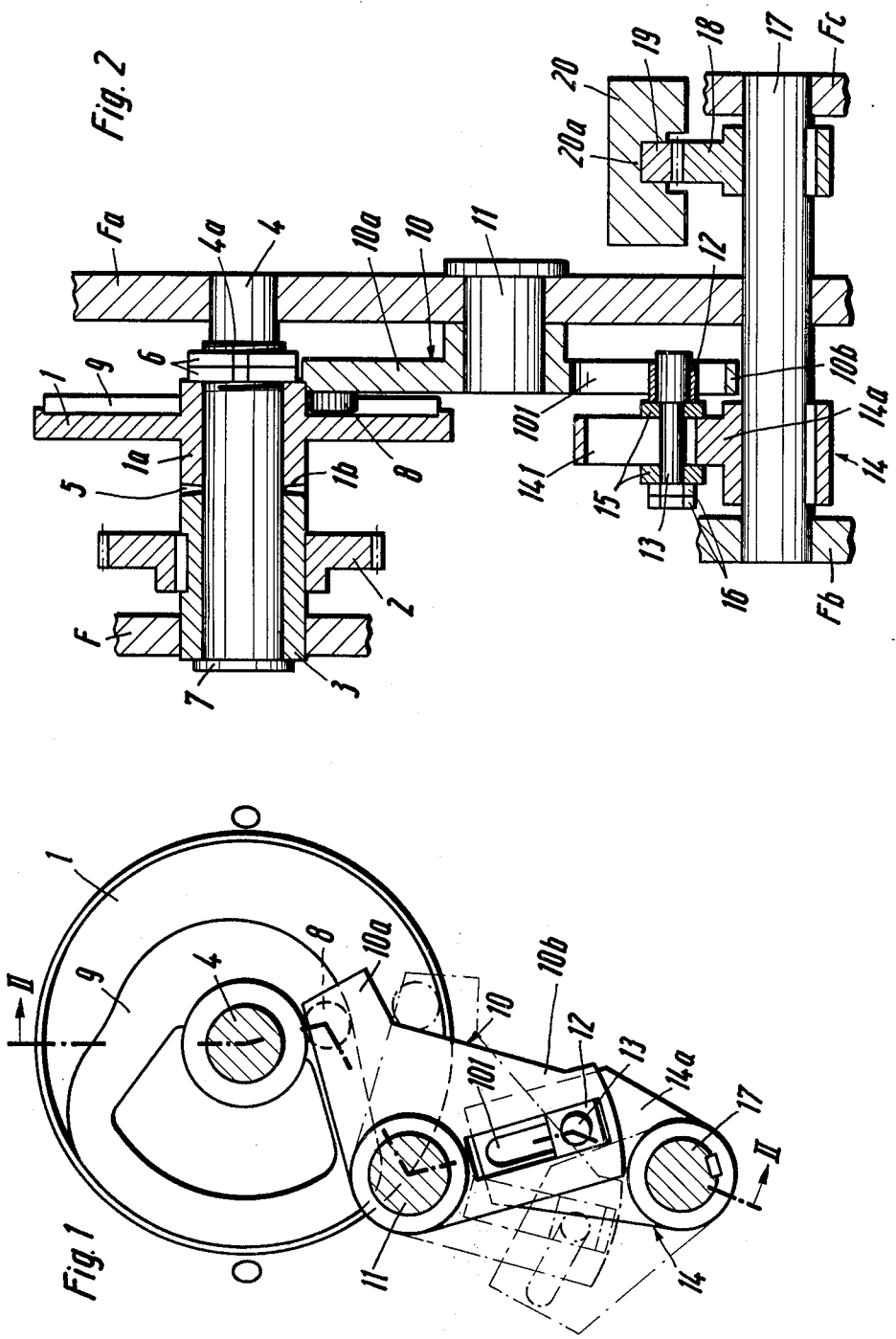

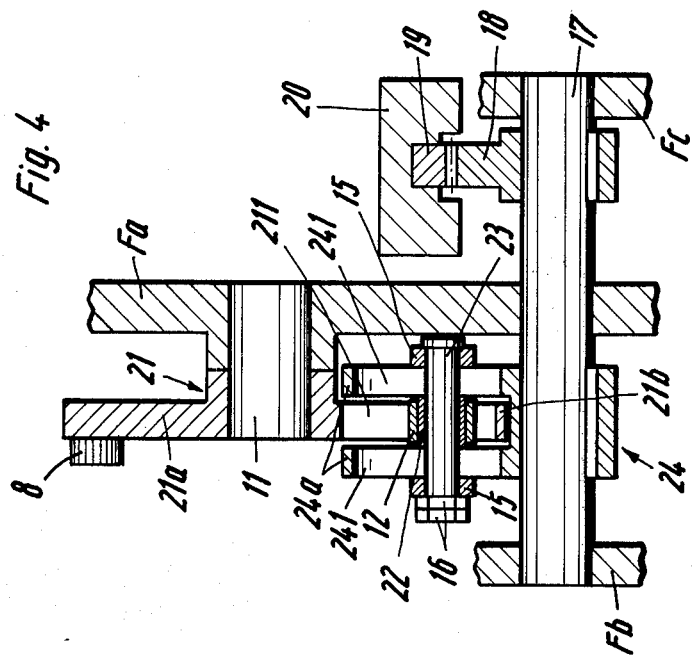
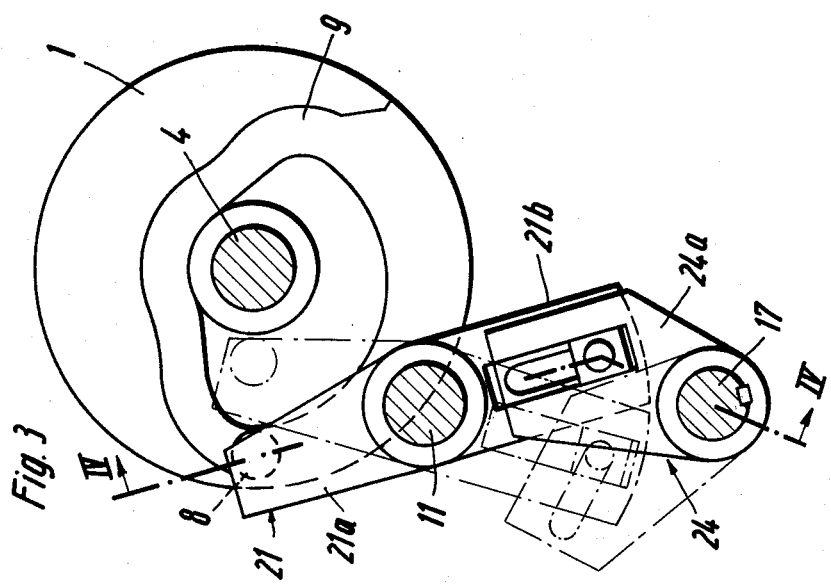

MECHANISM FOR MOVING SLIDES IN MACHINE TOOLS

BACKGROUND OF THE INVENTION

The present invention relates to machine tools in general, especially to multiple-spindle automatic machines, and more particularly to improvements in mechanisms for moving slides (especially side slides or cross slides) in machine tools.

It is known to derive motion for a cross slide from a rotating cam, especially from a radial cam whose track is configurated in such a way that the follower or followers are caused to move nearer to or further away from the cam axis when the cam is driven by a train of gears or the like. As a rule, the follower is mounted on a pivotable lever which transmits motion to a second lever mounted on a shaft which, in turn, transmits motion to a slide. Similar mechanisms are disclosed in German Pats. Nos. 758,568 and 890,888. The means for transmitting motion from the lever whose roller follower tracks the cam to the lever which turns the aforementioned shaft includes one or more intermediate levers, rods or analogous parts which reduce the rigidity and stability of the mechanism.

SUMMARY OF THE INVENTION

An object of the invention is to provide a novel and improved mechanism which can transmit motion to cross slides or analogous components of machine tools and wherein the number of parts between the input element (e.g., a rotary radial cam) and the driven component is less than in heretofore known mechanisms to thus contribute to rigidity and stability and to reduce the space requirements of the improved mechanism.

Another object of the invention is to provide a mechanism which can move a cross slide or another movable component of a machine tool through different distances, to and from selected starting and end positions, and at a practically unlimited number of speeds.

A further object of the invention is to provide a mechanism which can be rapidly adjusted to change the length, speed and/or other characteristics of movement of cross slides or other movable components in a machine tool, especially in a multiple-spindle automatic chucking or bar machine.

The invention is embodied in a mechanism for moving components in machine tools, particularly for reciprocating cross slides or side slides in multiple-spindle automatic machines. The mechanism comprises a first lever which is pivotable about a first axis and has a first arm, a second lever which is pivotable about a second axis (this second axis is preferably parallel to the first axis) and has a second arm, a yoke which constitutes one of the first and second arms and has a first elongated slot for a sliding block having a carrier which extends into one or more second elongated slots in the other arm, cam and follower means for pivoting the first lever, and means for transmitting motion from the second lever to a machine component, e.g., to a reciprocable cross slide in a multiple-spindle chucking or bar machine.

The cam and follower means preferably comprises a rotary radial face cam, means for rotating the cam, and a follower which is mounted on or made integral with an additional arm of the first lever. The axis of the cam is preferably parallel to the pivot axes of the two levers and the means for transmitting motion from the second lever to a machine component may comprise a shaft which is rigid with the second lever and defines the second axis, a gear or gear segment rigid with the shaft, and a toothed rack adjustably secured to the component and meshing with the gear or gear segment.

The first lever may be a bell crank lever wherein the additional arm makes with the first arm an angle of less than 180 degrees, or a straight lever wherein the additional arm is located substantially diametrically opposite the first arm with respect to the pivot axis of the first lever.

The novel features which are considered as characteristic of the invention are set forth in particular in the appended claims. The improved mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly sectional view of a mechanism which embodies one form of the invention;

FIG. 2 is a composite sectional view substantially as seen in the direction of arrows from the line II-II of FIG. 1;

FIG. 3 is a fragmentary partly elevational and partly sectional view of a second mechanism;

FIG. 4 is a composite sectional view substantially as seen in the direction of arrows from the line IV—IV of FIG. 3.

DESCRIPTION OF THE PREFERRED EMBODIMENTS

Figure 5:
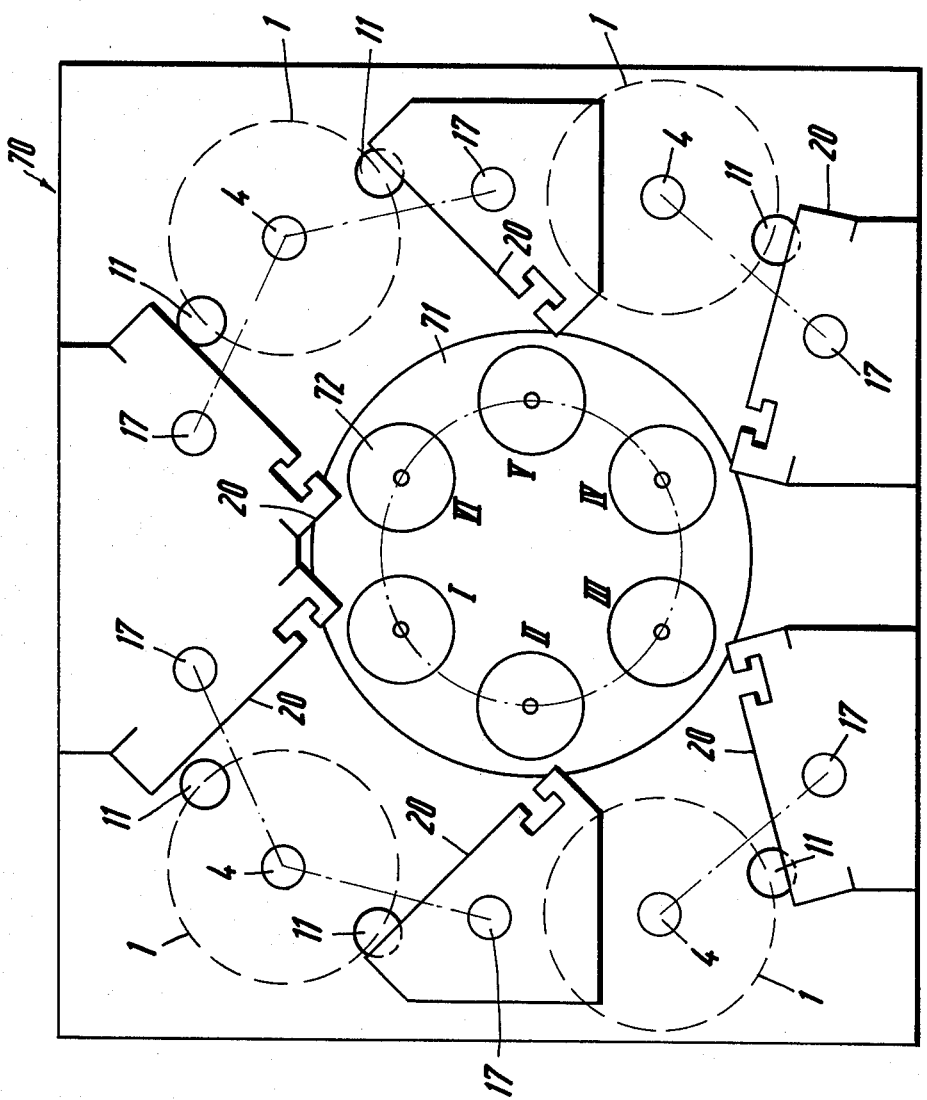
FIG. 5 is a side elevational view of the headstock in a multiple-spindle automatic machine with six work spindles, six cross slides and improved mechanisms for reciprocating the cross slides.

FIGS. 1 and 2 illustrate a mechanism which can move a tool carrier, e.g., a cross slide or side slide in a machine tool, particularly in a multiple-spindle automatic chucking or bar machine. A frame member F of the machine tool serves as a bearing for a sleeve 3 which is keyed to a driver gear 2 receiving motion from a prime mover, not shown. The right-hand end face of the sleeve 3, as viewed in FIG. 2, has an annulus of teeth 5 which mate with complementary teeth 1b on the left-hand end face of a hub 1a forming part of a rotary radial face cam 1. A shaft 4 which extends through the hub 1a and sleeve 3 has a first end portion journalled in a second frame member Fa and a second end portion provided with a flange 7 which bears against the left-hand end face of the sleeve 3, as viewed in FIG. 2. An externally threaded portion 4a of the shaft 4 meshes with two nuts 6 which cause the hub 1a to maintain its teeth 1b in mesh with the teeth 5 and to urge the left-hand end face of the sleeve 3 against the flange 7. If the operator wishes to change the angular position of the cam 1 with respect to the sleeve 3 and driver gear 2, or vice versa, the nuts 6 are loosened so that the teeth 1b can be moved out of mesh with the teeth 5, whereupon the sleeve 3 is turned relative to the hub 1a or vice versa. The nuts 6 are thereupon rotated in a direction to move the teeth 1b back into mesh with the teeth 5.

The groove or track 9 in the right-hand side of the cam 1, as viewed in FIG. 2, is tracked by a roller follower 8 which is rotatably mounted on the arm 10a of a bell crank lever 10. The latter can turn about the axis of a shaft 11 which is mounted in the frame member Fa. The other arm 10b of the bell crank lever 10 constitutes a yoke having an elongated slot 101 for a sliding block 12 which is mounted on a pin-shaped carrier 13. The latter is movable sideways in a slot 141 provided in the arm 14a of an one-armed lever 14 keyed to a shaft 17 which is turnable in the frame member Fa and in two additional frame members Fb, Fc. The carrier 13 can be moved between an infinite number of positions and can be fixed in a selected position (i.e., at a selected distance from the shaft 17) by a locking device including two washers 15 which flank the arm 14a of the lever 14 and a pair of nuts 16 which mesh with the externally threaded left-hand end portion of the carrier 13, as viewed in FIG. 2. The washers 15 surround the carrier 13 at the opposite ends of the slot 141.

The shaft 17 is rigid with a further gear 18 (e.g., a gear segment) which meshes with a toothed rack 19. The latter is movable lengthwise in an elongated recess 20a machined into the underside of the cross slide 20. The means for fixing the rack 19 to the cross slide 20 in a selected position may comprise one or more screws, bolts or analogous fasteners, not shown.

By changing the distance between the carrier 13 and the shaft 17 (i.e., by moving the carrier 13 in the slot 141 of the arm 14a of the lever 14), the operator can change the stroke of the cross slide 20 in response to rotation of the cam 1. On the other hand, by changing the position of the toothed rack 19 with respect to the cross slide 20 or vice versa, the operator can change the initial position of the slide 20 with respect to the associated work spindle in the spindle carrier of a chucking or bar machine. By changing the angular position of the cam 1 with respect to the gear 2, the operator can select the timing of the start of movement of cross slide 20 from its retracted or extended position.

An important advantage of the improved mechanism is that the yoke or arm 10b of the bell crank lever 10 is practically directly coupled to the arm 14a of the lever 14. This contributes to rigidity of the mechanism and to reproducibility of movements which are being transmitted to the cross slide 20 by parts 17, 18 and 19. The number of parts which pivot the lever 14 in response to pivoting of the lever 10 is minimal, i.e., such parts include only the sliding block 12, its carrier 13, and the means 15, 16 for locking the carrier 13 to the arm 14a in such a way that the carrier 13 is located in a selected portion of the slot 141 and occupies one of an infinite number of different positions which it is capable of assuming with respect to the lever 14 and shaft 17.

Another advantage of the improved mechanism is that it can be used, without appreciable modifications, for transmission of movement to a variety of machine components, particularly slides. This is due to the fact that the cam 1 is adjustable angularly of the driver gear 2 and sleeve 3, that the carrier 13 is adjustable relative to the lever 14, and that the toothed rack 19 is preferably adjustable relative to the slide 20. For example, and assuming that all cross slides of a multiple-spindle automatic chucking or bar machine are independently cammed, such machine may embody a discrete mechanism for each work spindle and the associated cross slide whereby the aforementioned adjustability of each mechanism enables the operators to select the length of forward and return strokes of each cross slide independently of the other slides, to time the start of forward movement of each cross slide independently of the other cross slides, and/or to select the starting point of each cross slide independently of the other cross slides.

FIGS. 3 and 4 illustrate a second mechanism wherein the bell crank lever 10 of FIGS. 1 and 2 is replaced with a straight two-armed lever 21. The roller follower 8 is mounted on the arm 21a of the lever 21 and the other arm 21b of the lever 21 again constitutes a yoke having a slot 211 for a sliding block 12 on a pin-shaped carrier 23 extending through the aligned slots 241 in the two prongs 24a of a bifurcated lever 24 replacing the lever 14 of FIGS. 1 and 2. The arm or yoke 21b of the lever 21 is disposed between the prongs 24a of the lever 24 and the carrier 23 can be fixed in a selected position (i.e., at a selected distance from the shaft 17) by two washers 15 and two nuts 16. The block 12 is turnable on a bearing sleeve 22 which surrounds the carrier 23 intermediate the prongs 24a of the lever 24. The bifurcated lever 24 contributes to the stability or rigidity of the mechanism.

In the embodiment of FIGS. 3 and 4, the cross slide 20 performs a forward stroke while the roller follower 8 on the upper arm 21a of the straight lever 21 moves nearer to the axis of the radial cam 1. In the embodiment of FIGS. 1 and 2, the bell crank lever 10 causes the cross slide 20 to perform a forward stroke while the roller follower 8 moves away from the common axis of the cam 1 and shaft 4.

FIG. 5 shows the headstock 70 of a multiple spindle chucking or bar machine. The headstock 70 supports a rotary spindle carrier 71 for six equally spaced parallel work spindles 72 each of which is associated with a discrete cross slide 20. The shafts 17 which are turnable in the headstock 70 to move the adjacent cross slides 20 receive motion from radial face cams 1 in a manner as illustrated in FIGS. 1–2 or 3–4. FIG. 5 shows that it suffices to provide four cams 1. A first cam (in the upper left-hand portion of FIG. 1) drives the shafts 17 for the cross slides 20 which are adjacent to work spindles 72 occupying the working stations numbered I and II; the cam 1 in the lower left-hand portion of FIG. 1 transmits motion to the shaft 17 for the cross slide 20 cooperating with the spindle 72 which dwells at the station III; the cam 1 in the lower right-hand portion of FIG. 5 drives the shaft 17 for the cross slide 20 which is associated with the work spindle 72 at the station IV; and the cam 1 in the upper right-hand portion of FIG. 5 transmits motion to shafts 17 which drive the cross slides 20 for the work spindles 72 dwelling at the stations V and VI. The axes of the carrier 71 and work spindles 72 are assumed to be horizontal, and the axes of the shafts 17 and cams 1 are parallel to the axis of the spindle carrier 71. If the machine tool comprises eight work spindles each of the four cams 1 shown in FIG. 5 can transmit motion to two cross slides.

Without further analysis, the foregoing will so fully reveal the gist of the present invention that others can by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. Mechanism for moving components in machine tools, particularly for reciprocating cross slides in automatic machines, comprising a first lever pivotable about a first axis and having a first arm; a second lever pivotable about a second axis and having a second arm, one of said arms constituting a yoke having a first elongated slot and the other of said arms having at least one second elongated slot; a sliding block extending into and being freely movable lengthwise of said first slot, said block having a carrier extending into and movable lengthwise of said second slot; means for releasably locking said carrier to said other arm; cam and follower means for pivoting said first lever whereby said first lever pivots said second lever through the medium of said block; and means for transmitting motion from said second lever to a machine component.

2. Mechanism as defined in claim 1, wherein said one arm is said first arm and said means for transmitting motion comprises a shaft rigid with said second lever and defining said second axis.

3. Mechanism as defined in claim 1, wherein said first lever comprises an additional arm and said cam and follower means comprises a rotary radial cam and a follower provided on said additional arm and tracking said cam.

4. Mechanism as defined in claim 1, wherein said other arm comprises a plurality of prongs and has a plurality of elongated second slots, one in each of said prongs.

5. Mechanism as defined in claim 1, wherein said cam and follower means comprises a rotary cam and a follower provided on said first lever and tracking said cam, and further comprising means for rotating said cam including a rotary driving member coaxial with said cam, said cam being movable angularly with respect to said driving member and further comprising means for securing said cam to said driving member in a selected angular position.

6. Mechanism as defined in claim 5, wherein said driving member comprises a sleeve having a first annulus of teeth, said cam having a second annulus of teeth and being movable axially of said sleeve to move said second annulus of teeth into and out of mesh with said first annulus of teeth whereby said cam can move angularly with respect to said sleeve when said second annulus is disengaged from said first annulus, said securing means comprising a device for normally holding said second annulus of teeth in mesh with said first annulus.

7. Mechanism as defined in claim 1, wherein said first lever is a bell crank lever and includes an additional arm, said cam and follower means comprising a rotary radial cam and a follower provided on said additional arm and tracking said cam.

8. Mechanism as defined in claim 1, wherein said first lever further comprises an additional arm located substantially diametrically opposite said first arm with respect to said first axis, said cam and follower means comprising a rotary radial cam and a follower provided on said additional arm and tracking said cam.

9. Mechanism as defined in claim 1, wherein said machine component is a reciprocable slide and said motion transmitting means comprises a shaft rigid with said second lever and defining said second axis, a gear rigid with said shaft, and a toothed rack secured to said slide and mating with said gear.

10. Mechanism as defined in claim 1, wherein said first lever further comprises an additional arm and said cam and follower means comprises a rotary radial face cam, means for rotating said cam about a third axis parallel to said first and second axes, and a roller follower provided on said additional arm and tracking said face cam.

* * * * *